(12) United States Patent
Dresang et al.

(10) Patent No.: US 11,118,711 B1
(45) Date of Patent: Sep. 14, 2021

(54) ROTARY SWIVEL JOINT

(71) Applicant: UEMSI/HTV, Inc., Jackson, WI (US)

(72) Inventors: Richard D. Dresang, Hartford, WI (US); Stephen R. Frey, Waukesha, WI (US); Kevin J. Witt, Jackson, WI (US); Daniel M. Olson, Mequon, WI (US)

(73) Assignee: UEMSI/HTV, INC., Jackson, WI (US)

( * ) Notice: Subject to any disclaimer, the term of this patent is extended or adjusted under 35 U.S.C. 154(b) by 0 days.

(21) Appl. No.: 17/195,719

(22) Filed: Mar. 9, 2021

(51) Int. Cl.
*F16L 27/08* (2006.01)

(52) U.S. Cl.
CPC .................. *F16L 27/0849* (2013.01)

(58) Field of Classification Search
CPC ............ F16L 27/0849; F16L 27/0808; F16L 27/0837; F16L 27/0845; F16L 27/0824; F16L 43/00
USPC .......... 285/179, 181, 280, 281, 121.5, 121.3
See application file for complete search history.

(56) References Cited

U.S. PATENT DOCUMENTS

| | | | |
|---|---|---|---|
| 2,305,524 A * | 12/1942 | Frazer-Nash | F16L 27/0828 285/276 |
| 5,110,159 A | 5/1992 | Herold et al. | |
| 5,609,174 A * | 3/1997 | Ferguson | A47L 15/23 134/180 |
| 7,422,031 B2 | 9/2008 | Benson et al. | |

* cited by examiner

*Primary Examiner* — Aaron M Dunwoody
(74) *Attorney, Agent, or Firm* — Donald J. Ersler

(57) ABSTRACT

A rotary swivel joint preferably includes a swivel housing, a rotary swivel, an end plate, two sets of sealed bearings, a swivel seal and an O-ring. The swivel housing includes a threaded tube inlet and a swivel receiver bore. The rotary swivel includes a through bore, a threaded swivel inlet, a bearing diameter and a sealing diameter and an outer diameter. An O-ring groove is formed in the bearing diameter to receive the O-ring. The first and second sealed bearing sets are retained on the bearing diameter and axially retained with a plurality of snap rings. The swivel seal is retained on the sealing diameter. The rotary swivel is inserted through a center bore in the end plate. The end plate is preferably fastened to the swivel housing with a plurality of fasteners.

15 Claims, 6 Drawing Sheets

ROTARY SWIVEL JOINT

BACKGROUND OF THE INVENTION

1. Field of the Invention

The present invention relates generally to the sewer industry and more specifically to a rotary swivel joint, which is an improvement over prior art rotary swivel joints used in the sewer industry.

2. Discussion of the Prior Art

A prior art rotary swivel joint typically includes two sets of ball bearings, which must be counted out and manually loaded during manufacture and servicing of the rotary swivel joint. The prior art rotary swivel joint was first invented in the 1940s and has not been improved upon since. If less than the correct number of ball bearings are added, the rotary swivel joint will still work, but the ball bearings will wear out prematurely. The two sets of ball bearings must also be lubricated periodically. The gland nut must be periodically adjusted to a sweet spot of tension to exert force on a pair of rubber seals that wear down over time. The process of adjusting tension on the pair of rubber seals requires an operator to remove a screw on the housing, remove a position tab, tighten the gland nut, replace the position tab in one of two slots, and reinstall the screw. Additionally, water can leak through the gland nut threads and set screws that are used to load and retain the ball bearings.

Replacing one of the two o-rings requires all the ball bearings to be removed by unscrewing two set screws; a degreasing agent must be used to allow the ball bearing to be removed through the two set screw threaded hole; the process of removing ball bearings frequently requires a number of minutes to bang the unit to get all the ball bearings out; a locking tab screw must be removed and then a locking tab; the gland nut is then unscrewed from the housing; the process will take upwards of 30 minutes to complete if the mechanic does not lose any of the balls; and then the process is reversed for reassembly. The distance between a centerline of the ball bearings is very small, which produces poor axially loading. U.S. Pat. No. 5,110,159 to Herold et al. discloses a rotating union for supplying compressed air to a rotating part of a printing press. U.S. Pat. No. 7,422,031 to Benson et al. discloses rotary unions, fluid delivery systems, and related methods.

Accordingly, there is a clearly felt need in the art for a rotary swivel joint, which does not periodically have to be greased; does not require an adjustment of a gland nut to tension two seals; eliminates a sealing ring and a gland nut; does not require an extensive disassembly to replace a worn O-ring relative to the prior art, which includes two sealed bearing sets that do not require maintenance or to be manually loaded into the rotary swivel joint and which includes a swivel seal that is self-adjusting instead of two seals that need to be periodically tensioned.

SUMMARY OF THE INVENTION

The present invention provides a rotary swivel joint, which does not require periodic maintenance. The rotary swivel joint preferably includes a swivel housing, a rotary swivel, an end plate, two sealed bearing sets, a swivel seal and an O-ring. The swivel housing includes a threaded tube inlet and a swivel receiver bore. It is preferable that a centerline of the threaded tube inlet be located at a 90 degree angle to a centerline of the swivel receiver bore. However, the threaded tube inlet and the swivel receiver bore could be on the same centerline. The threaded tube inlet is formed in one end of the swivel housing and the swivel receiver bore is formed in an opposing end of the swivel housing. The swivel receiver bore includes a rotary swivel bore, a sealing bore and a bearing bore. The rotary swivel bore is formed at a bottom of the swivel receiver bore to receive the rotary swivel. The sealing bore is sized to firmly receive an outer diameter of the swivel seal. Finally, the bearing bore is sized to receive an outer diameter of the two sealed bearing sets.

The rotary swivel includes a through bore, a threaded swivel inlet, a bearing diameter, a sealing diameter, an O-ring diameter and an outer diameter. The through bore is formed through a length of the rotary swivel. The threaded swivel inlet is formed in one end of the rotary swivel. The outer diameter is formed on the one end of the rotary swivel. The sealing diameter is located on an opposing end of the rotary swivel. The bearing diameter is located adjacent and past the sealing diameter. The O-ring diameter is located between the bearing diameter and the outer diameter. An O-ring groove is formed in the O-ring diameter to receive an O-ring. A first clip groove is formed near a bearing shoulder, which is a step between the bearing diameter and the O-ring diameter. A first spring clip axially retains a first sealed bearing set against the bearing shoulder. A second clip groove and a third clip groove are located on an opposing end of the bearing diameter. The second and third clip grooves are sized to receive second and third spring clips. The second and third spring clips are located to axially retain the second sealed bearing set and the swivel seal.

The end plate includes a center bore and a plurality of counter sunk holes. A plurality of threaded taps are formed in a face of the opposing end of the swivel housing to threadably receive a plurality of fasteners. The end plate is used to axially retain the first sealed bearing set and the rotary swivel in the swivel housing.

Accordingly, it is an object of the present invention to provide a rotary swivel joint, which includes two sets of sealed bearing races, which do not have to be periodically greased, or have to be manually loaded during maintenance.

It is a further object of present invention to provide a rotary swivel joint, which eliminates a sealing ring and a gland nut.

It is another object of present invention to provide a rotary swivel joint, which does not require an adjustment of a gland nut to tension two seals.

It is yet another object of present invention to provide a rotary swivel joint, which does not require an extensive disassembly to replace a worn O-ring relative to that of the prior art.

It is yet another object of present invention to provide a rotary swivel joint, which includes two sealed bearing sets that which do not require maintenance or to be manually loaded into the rotary swivel joint.

Finally, it is another object of the present invention to provide a rotary swivel joint, which includes a swivel seal that is self-adjusting instead of two seals that need to be periodically tensioned.

These and additional objects, advantages, features and benefits of the present invention will become apparent from the following specification.

DETAILED DESCRIPTION OF THE PREFERRED EMBODIMENTS

Figure 1:
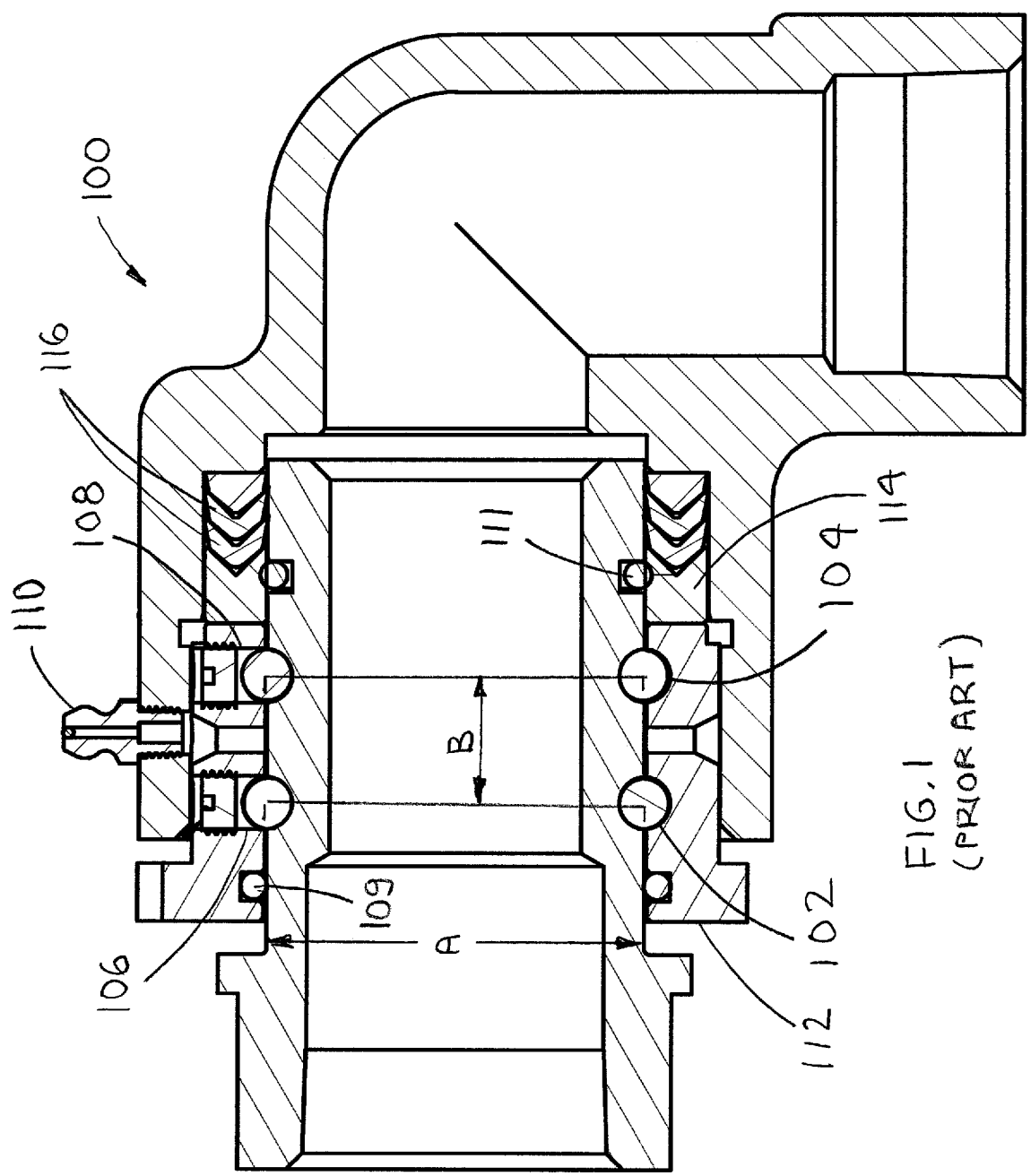
FIG. 1 is a cross sectional view of a prior art rotary swivel joint used in the sewer industry.

With reference to FIG. 1, a prior art rotary swivel joint 100 is shown. The prior art rotary swivel joint 100 typically includes two sets of ball bearings 102, 104, which must be manually loaded through tapped holes 106, 108. The two sets of ball bearings 102, 104 must also be lubricated periodically through a zerk fitting 110. Additionally, the rotary swivel joint 100 includes a gland nut 112 and a sealing ring 114, which are eliminated from a rotary swivel joint 1. Replacing one of the two O-rings 109, 111, requires the extensive process of removing and reinstalling the two sets of ball bearings 102, 104. Tension on two seals 116 must be periodically adjusted by rotating the gland nut 112. Axially loading of the two sets of ball bearings 102, 104 has a poor ratio of 0.337. Dimension A has a typical value of 1.870 inches and dimension B has a typical value of 0.630 inches. The ratio of dimension B/dimension A is 0.337.

Figure 3:
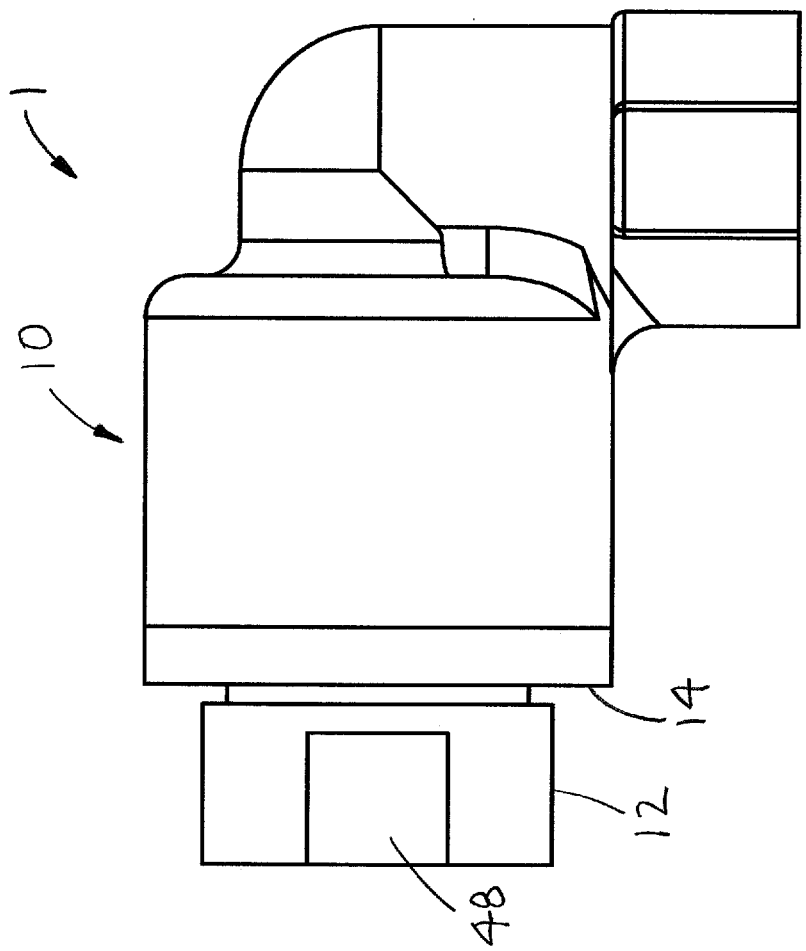
FIG. 3 is a side view of a rotary swivel joint in accordance with the present invention.
Figure 2:
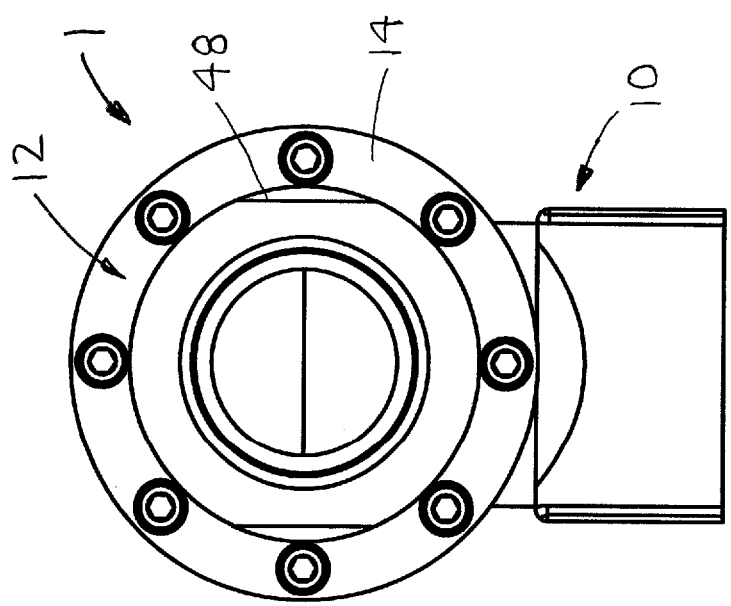
FIG. 2 is a front view of a rotary swivel joint in accordance with the present invention.
Figure 4:
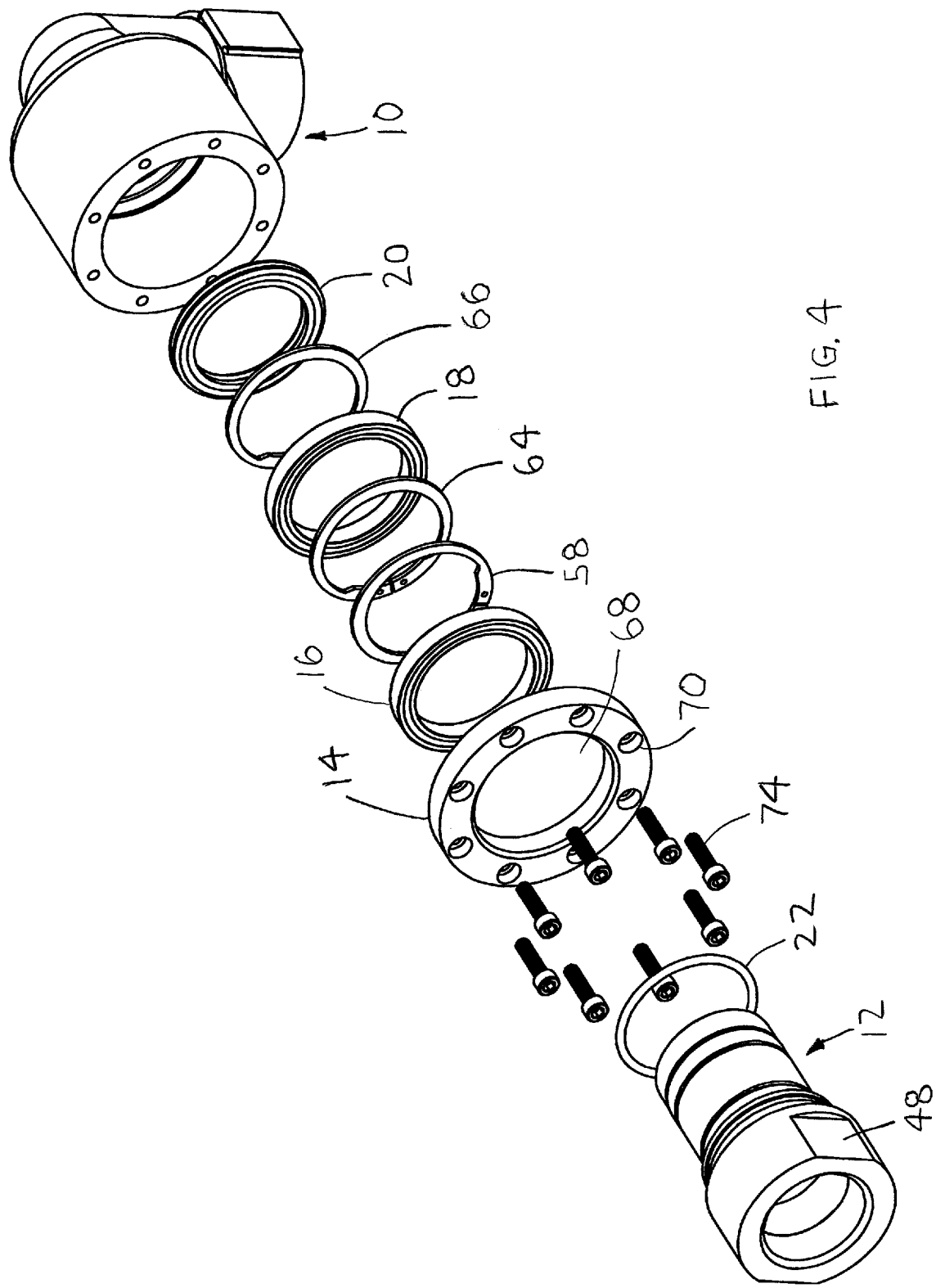
FIG. 4 is an exploded perspective view of a rotary swivel joint in accordance with the present invention.
Figure 5:
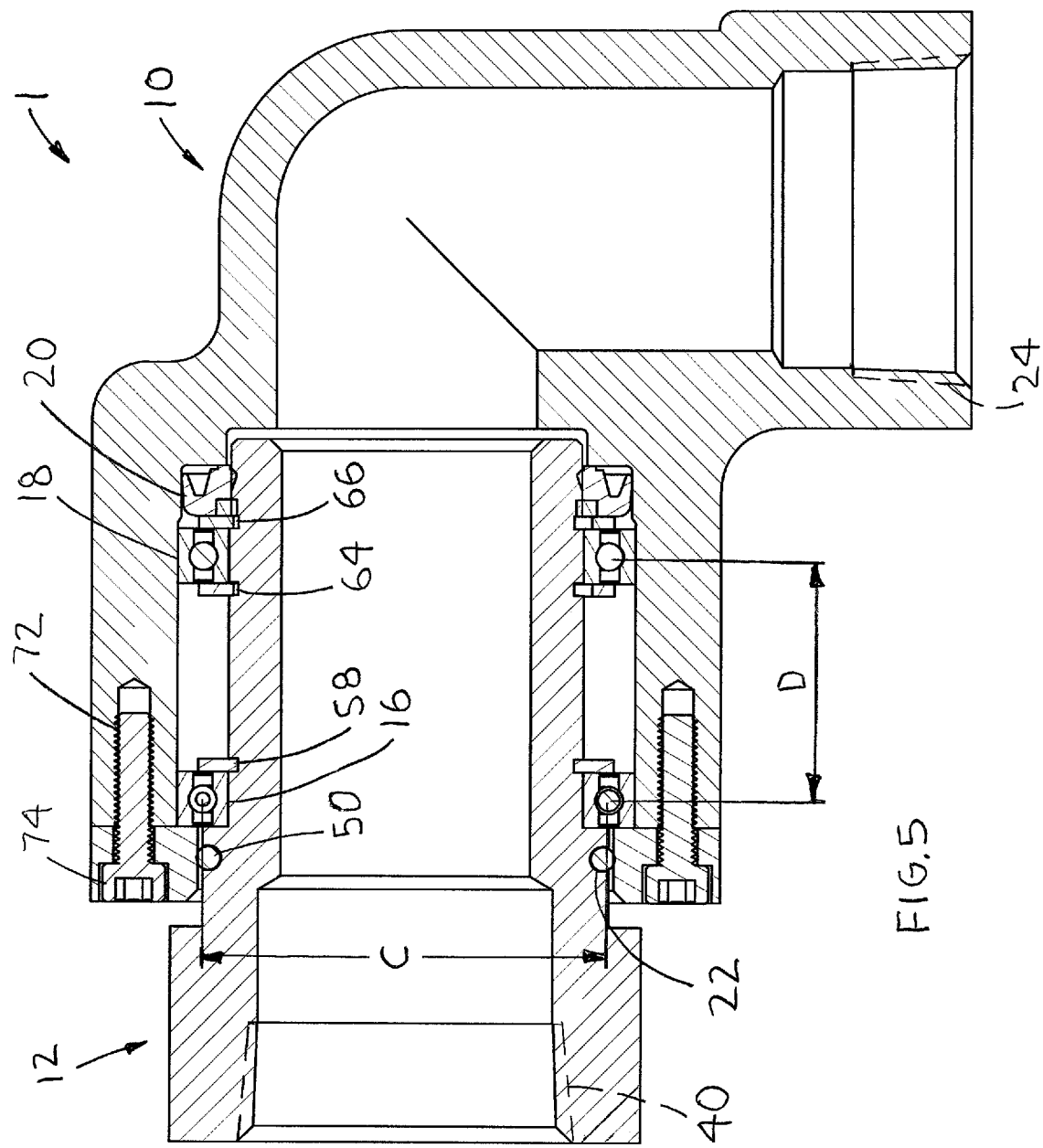
FIG. 5 is a cross sectional of a rotary swivel joint in accordance with the present invention.
Figure 6:
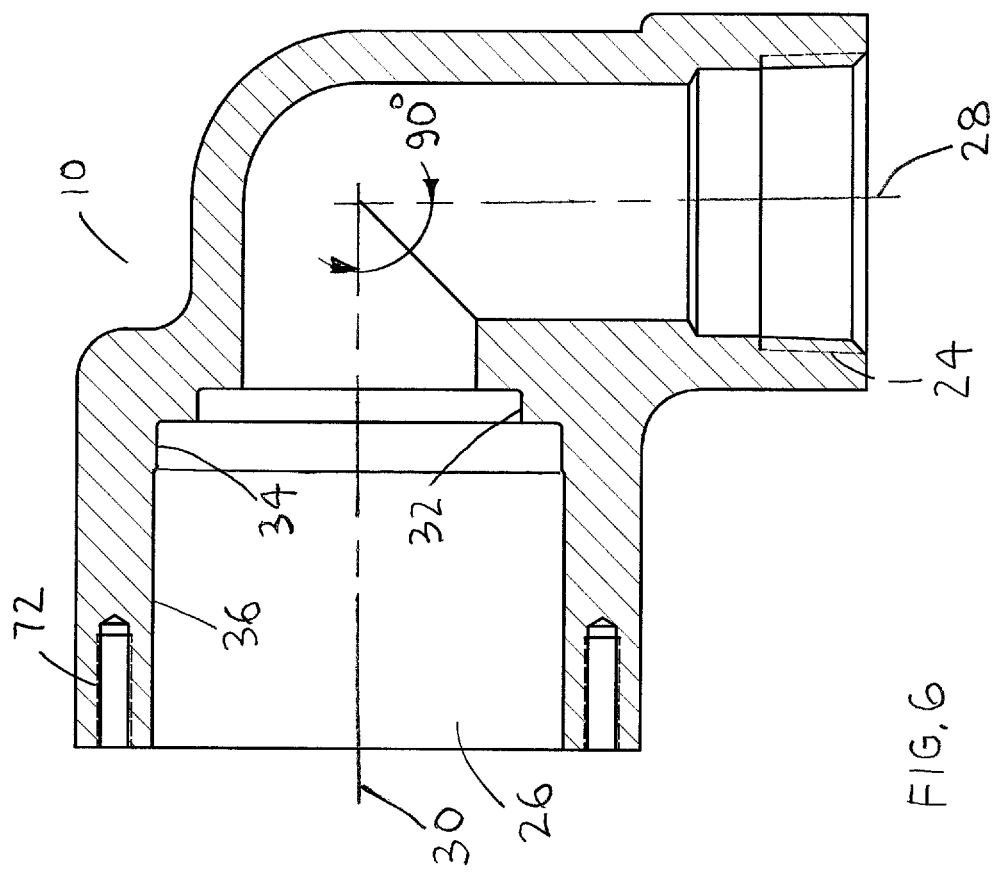
FIG. 6 is a cross sectional view of a swivel housing of a rotary swivel joint in accordance with the present invention.

With reference now to the drawings, and particularly to FIG. 3, there is shown the rotary swivel joint 1. With reference to FIGS. 2, 4 and 5, the rotary swivel joint 1 preferably includes a swivel housing 10, a rotary swivel 12, an end plate 14, a first sealed bearing set 16, a second sealed bearing set 18, a swivel seal 20 and an O-ring 22. With reference to FIG. 6, the swivel housing 10 includes a threaded tube inlet 24 and a swivel receiver bore 26. A centerline 28 of the threaded tube inlet 24 is located at a 90 degree angle (or perpendicular) relative to a centerline 30 of the swivel receiver bore 26. However, the threaded tube inlet 24 and the swivel receiver bore 26 could be on the same centerline. The threaded tube inlet 24 is formed in one end of the 90 degree swivel housing 10 and the swivel receiver bore 26 is formed in an opposing end of thereof. A pipe or hose is threaded into the threaded tube inlet 24. The swivel receiver bore 26 includes a rotary swivel bore 32, a sealing bore 34 and a bearing bore 36. The rotary swivel bore 32 is formed at a bottom of the swivel receiver bore 26 to provide clearance for the rotary swivel 12. The sealing bore 34 is sized to firmly receive an outer diameter of the swivel seal 20. Finally, the bearing bore 36 is sized to receive an outer diameter of the first and second sealed bearing sets 16, 18. The following dimension are given by way of example and not by way of limitation. A diameter C of the bearings 16, 18 is typically 2.03 inches. A distance D between the first and second set of bearings is typically 1.21 inches. A ratio between diameter C and distance D is 0.596. It is preferred that the ratio between diameter C and distance D be at least 0.59. The 0.59 is a vast improvement over the prior art ratio of 0.34.

Figure 7:
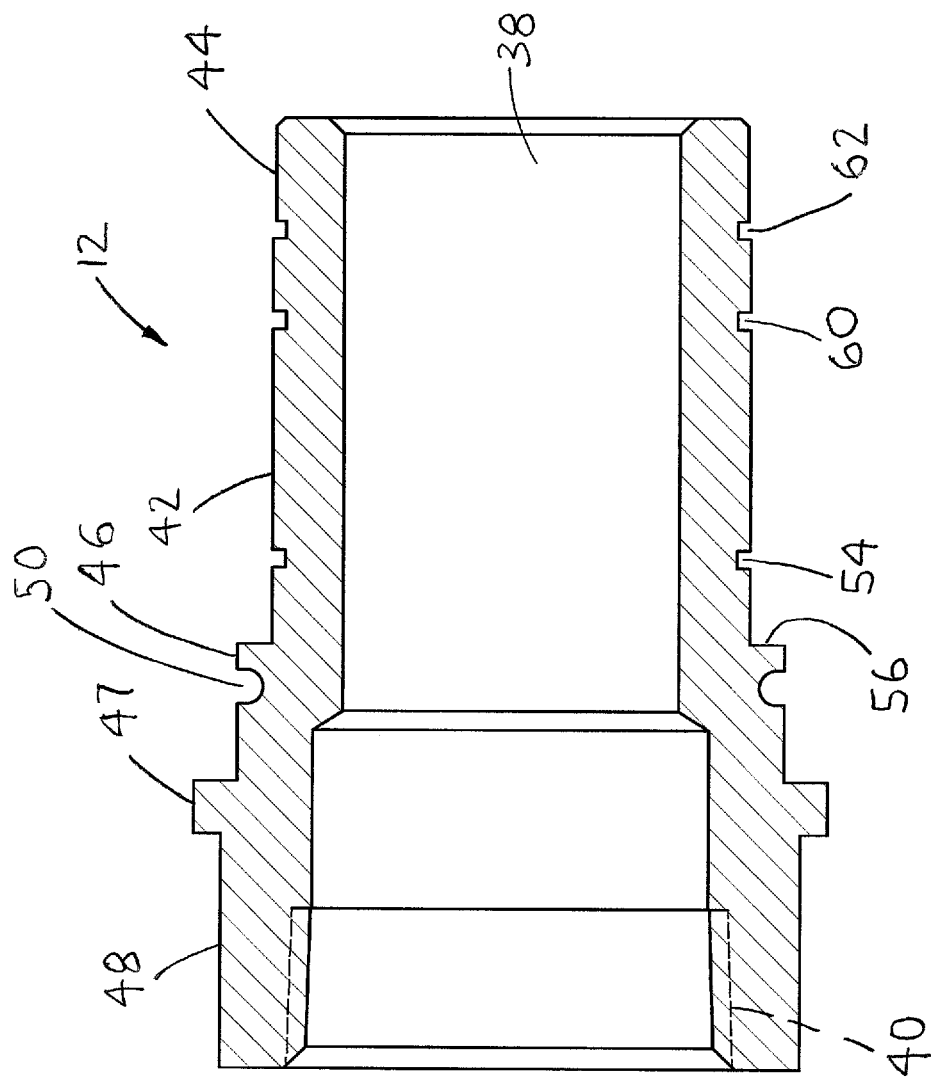
FIG. 7 is a cross sectional view of a rotary swivel of a rotary swivel joint in accordance with the present invention.

With reference to FIG. 7, the rotary swivel 12 includes a through bore 38, a threaded swivel inlet 40, a bearing diameter 42, a sealing diameter 44, an O-ring sealing diameter 46 and an outer diameter 47. The through bore 38 is formed through a length of the rotary swivel 12. The threaded swivel inlet 40 is formed in one end of the rotary swivel 12. A second pipe or hose is threaded into the threaded swivel inlet 40. The outer diameter 47 is formed on the one end of the rotary swivel 12. A wrench flat 48 is formed in the outer diameter 47. The sealing diameter 44 is located on an opposing end of the rotary swivel 12. The bearing diameter 42 is located adjacent and past the sealing diameter 44. The O-ring sealing diameter 46 is located between the bearing diameter 42 and the outer diameter 47. An O-ring groove 50 is formed in the O-ring sealing diameter 46 to receive the O-ring 22. A first clip groove 54 is formed near a bearing shoulder 56, which is a step between the bearing diameter 46 and the sealing diameter 44. A first spring clip 58 axially retains the first sealed bearing set 16 against the bearing shoulder 56. A second clip groove 60 and a third clip groove 62 are located on the opposing end of the rotary swivel 12. The second and third clip grooves 60, 62 are sized to receive a second clip 64 and a third spring clip 66, respectively. The second and third spring clips 64, 66 are located to axially retain the second sealed bearing set 18. The third spring clip 66 and a bottom of the swivel seal bore 34 prevent axial movement of the swivel seal 20. The swivel seal 20 is self-adjusting, fluid pressure of the media that flows through the rotary swivel joint 1 forces a lip of the swivel seal 20 against the rotary swivel 12. The higher the pressure of the fluid, the greater the sealing. The first and second sealed bearing sets 16, 18 are preferably sourced from Boca Bearings. The swivel seal 20 is preferably a rod buffer seal sourced from Parker. However, other bearings and seals may also be used.

The end plate 14 includes a center bore 68 and a plurality of counter sunk holes 70. A plurality of threaded taps 72 are formed in a face of the opposing end of the swivel housing 10 to threadably receive a plurality of fasteners 74. The end plate 14 is used to axially retain the first sealed bearing set 16 and the rotary swivel 12 in the swivel receiver bore 26. However, methods of retaining the end plate against the swivel housing 10 could also be used. The rotary swivel joint 1 is preferably assembled in the following manner. The O-ring 22 is placed in the O-ring groove 50. The rotary swivel 12 is inserted through center bore 68 in the end plate 14. The first sealed bearing set 16 is pushed on to the bearing diameter 46 and retained in place with the first spring clip 58. The second spring clip 64 is secured into the second clip groove 60. The second sealed bearing set 18 is pushed on to the bearing diameter 46 and retained in place with the third spring clip 66. The swivel seal 20 is pushed on to sealing diameter 44. The rotary swivel 12 is then pushed into the swivel receiver bore 26. The end plate 14 is then secured to the opposing end of the swivel housing with the plurality of fasteners 74. Fluid pressure inside the rotary swivel joint is about 2,500 psi-6,500 psi.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A rotary swivel joint comprising:
    a swivel housing includes a threaded tube inlet on one end and a swivel receiver bore on an opposing end thereof;

a rotary swivel includes a through bore, a threaded swivel inlet is formed in said through bore on one end, a bearing diameter is formed on an outer diameter of said rotary swivel;

a first sealed bearing set and a second sealed bearing set, a ratio between a distance between said first and second sealed bearings relative to a diameter of said first and second bearings is at least 0.59; and an end plate includes a center bore, wherein said rotary swivel is inserted through said center bore, said first and second bearing sets are retained on said bearing diameter, said rotary swivel is inserted into said swivel receiver bore, said end plate is secured to said opposing end of said swivel housing.

2. The rotary swivel joint of claim 1, further comprising:
a bearing shoulder is formed on said rotary swivel on one end of said bearing diameter, said first sealed bearing set is retained between said bearing shoulder and a first lock ring.

3. The rotary swivel joint of claim 2, further comprising:
an O-ring groove is formed in an O-ring diameter, said O-ring diameter is located adjacent said one end of said bearing diameter, an O-ring is retained in said O-ring groove.

4. The rotary swivel joint of claim 2, further comprising:
said second sealed bearing set is located on an opposing end of said bearing diameter, said second sealed bearing set is axially retained between a second lock ring and a third lock ring.

5. The rotary swivel joint of claim 4, further comprising:
a swivel seal is located between said third lock ring and a bottom of said swivel receiver bore in said swivel housing.

6. The rotary swivel joint of claim 1 wherein:
a centerline of said threaded tube inlet is perpendicular to said swivel receiver bore.

7. A rotary swivel joint comprising:
a swivel housing includes a threaded tube inlet on one end and a swivel receiver bore on an opposing end thereof;
a rotary swivel includes a through bore, a threaded swivel inlet is formed in said through bore on one end, a bearing diameter is formed on an outer diameter of said rotary swivel;
a first sealed bearing set and a second sealed bearing set, a bearing shoulder is formed on said rotary swivel on one end of said bearing diameter, said first sealed bearing set is retained between said bearing shoulder and a first retention device on said bearing shoulder, said second sealed bearing set is located on an opposing end of said bearing diameter, said second sealed bearing set is axially retained between a second retention device and a third retention device on said bearing diameter; and
an end plate includes a center bore, wherein said rotary swivel is inserted through said center bore, said rotary swivel is inserted into said swivel receiver bore, said end plate is secured to said opposing end of said swivel housing.

8. The rotary swivel joint of claim 7, further comprising:
an O-ring groove is formed in an O-ring diameter, said O-ring diameter is located adjacent said one end of said bearing diameter, an O-ring is retained in said O-ring groove.

9. The rotary swivel joint of claim 7 wherein:
a ratio between a distance between said first and second sealed bearings relative to a diameter of said first and second bearings is at least 0.59.

10. A rotary swivel joint comprising:
a swivel housing includes a threaded tube inlet on one end and a swivel receiver bore on an opposing end thereof;
a rotary swivel includes a through bore, a threaded swivel inlet is formed in said through bore on one end, a bearing diameter is formed on an outer diameter of said rotary swivel, a sealing diameter is formed on an opposing end of said rotary swivel, an O-ring diameter is formed adjacent said bearing diameter near said one end thereof;
a first sealed bearing set and a second sealed bearing set;
a swivel seal;
an O-ring; and
an end plate includes a center bore, wherein said rotary swivel is inserted through said center bore, said first and second bearing sets are retained on said bearing diameter, said swivel seal is retained on said sealing diameter, said O-ring is retained on said O-ring diameter, said rotary swivel is inserted into said swivel receiver bore, said end plate is secured to said opposing end of said swivel housing.

11. The rotary swivel joint of claim 10, further comprising:
a bearing shoulder is formed on said rotary swivel on one end of said bearing diameter, said first sealed bearing set is retained between said bearing shoulder and a first lock ring.

12. The rotary swivel joint of claim 11, further comprising:
an O-ring groove is formed in said O-ring diameter, said O-ring is retained in said O-ring groove.

13. The rotary swivel joint of claim 11, further comprising:
said second sealed bearing set is located on an opposing end of said bearing diameter, said second sealed bearing set is axially retained between a second lock ring and a third lock ring.

14. The rotary swivel joint of claim 13, further comprising:
said swivel seal is located between said third lock ring and a bottom of said swivel receiver bore in said swivel housing.

15. The rotary swivel joint of claim 10 wherein:
a centerline of said threaded tube inlet is perpendicular to said swivel receiver bore.

* * * * *